(12) United States Patent
West

(10) Patent No.: US 11,905,913 B2
(45) Date of Patent: Feb. 20, 2024

(54) THRUST REVERSER INTERSPATIAL BLOCKER SYSTEM

(71) Applicant: Spirit AeroSystems, Inc., Wichita, KS (US)

(72) Inventor: Randall R. West, Wichita, KS (US)

(73) Assignee: Spirit AeroSystems, Inc., Wichita, KS (US)

( * ) Notice: Subject to any disclaimer, the term of this patent is extended or adjusted under 35 U.S.C. 154(b) by 0 days.

(21) Appl. No.: 17/507,836

(22) Filed: Oct. 22, 2021

(65) Prior Publication Data

US 2023/0127457 A1 Apr. 27, 2023

(51) Int. Cl.
*F02K 1/72* (2006.01)
*F02K 1/76* (2006.01)
*F02K 1/66* (2006.01)

(52) U.S. Cl.
CPC ............. *F02K 1/72* (2013.01); *F02K 1/66* (2013.01); *F02K 1/763* (2013.01); *F05D 2260/50* (2013.01); *F05D 2260/605* (2013.01)

(58) Field of Classification Search
CPC ... F02K 1/72; F02K 1/70; F02K 1/763; F02K 1/66; F02K 1/62; F02K 1/625
See application file for complete search history.

(56) References Cited

U.S. PATENT DOCUMENTS

| | | | |
|---|---|---|---|
| 2,940,252 A * | 6/1960 | Reinhart | F02K 1/386 239/455 |
| 6,568,172 B2 | 5/2003 | Jannetta et al. | |
| 8,104,261 B2 | 1/2012 | Marshall et al. | |
| 8,316,632 B2 | 11/2012 | West et al. | |
| 8,701,386 B2 | 4/2014 | Letay et al. | |
| 9,038,367 B2 | 5/2015 | Suciu et al. | |
| 2013/0067885 A1 * | 3/2013 | Suciu | F02K 1/1207 60/226.2 |
| 2021/0131380 A1 * | 5/2021 | Gormley | F02K 1/763 |

OTHER PUBLICATIONS

International Search Report and Written Opinion in related PCT Application PCT/US2022/047124 dated Jul. 4, 2023, 10 pages.

* cited by examiner

*Primary Examiner* — Andrew H Nguyen
(74) *Attorney, Agent, or Firm* — HOVEY WILLIAMS LLP

(57) ABSTRACT

An interspatial blocker for a thrust reverser system of a turbofan engine, and a thrust reverser system and a turbofan engine incorporating the same. The interspatial blocker includes a first and second flap that rotate from a stored position to a blocking position, and a leading-edge structure rotatably coupling the first flap to the second flap. The leading-edge structure is set up to be installed in a fan nacelle of a turbofan engine in a substantially radial orientation such that the first flap rotates in a first direction about a first axis extending in a substantially radial direction from the stored position to the blocking position, and such that the second flap rotates in a second direction about a second axis extending in the substantially radial direction from the stored position to the blocking position, with the first direction being opposite to the second direction.

16 Claims, 12 Drawing Sheets

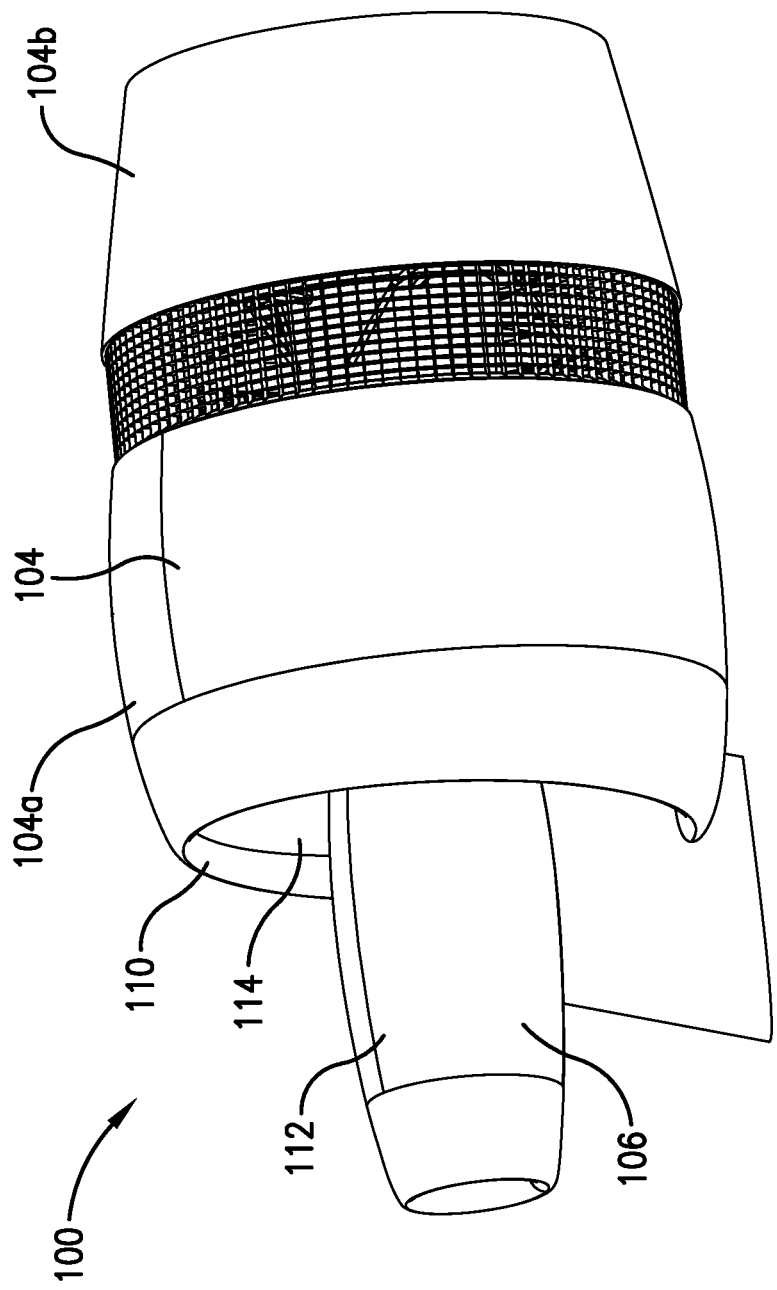

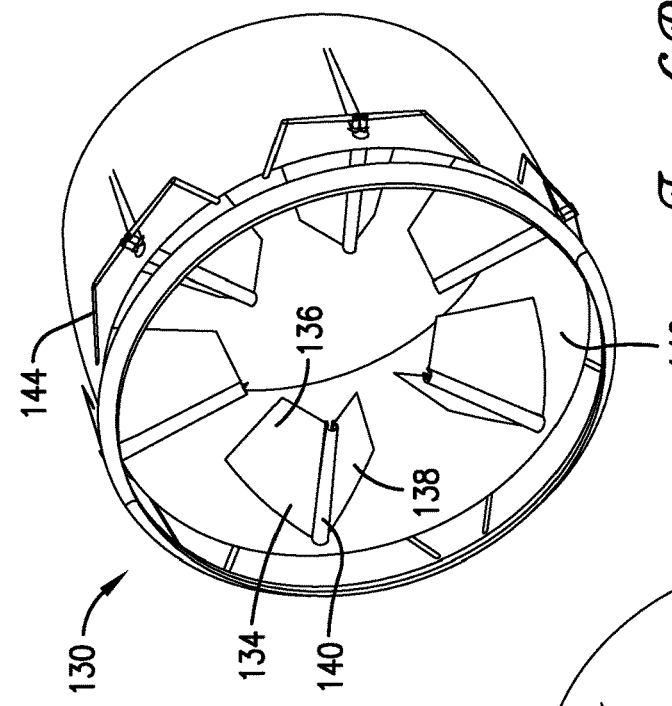
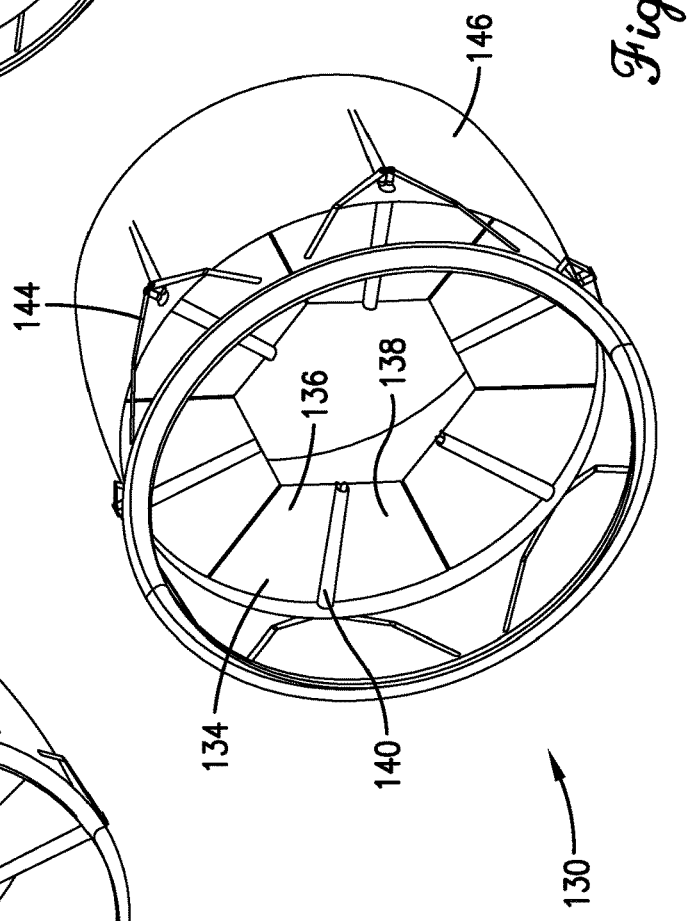
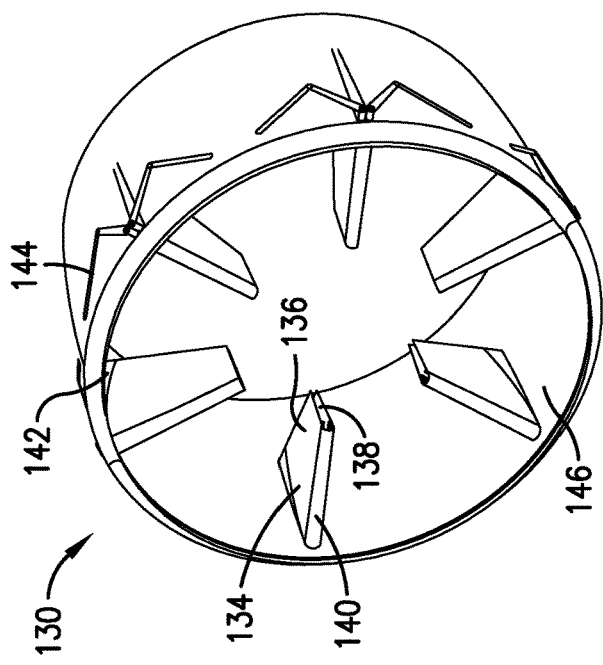

THRUST REVERSER INTERSPATIAL BLOCKER SYSTEM

BACKGROUND

Turbofan engines incorporate a turbofan core operatively coupled to a fan disposed within a duct of a fan nacelle. The turbine core may include a compressor, a combustor, and a turbine. Air enters the core through an open front end and then is compressed by the compressor and mixed with fuel and ignited in the combustor. Hot combustion gases flow from the combustor into the turbine, spinning the turbine as the gasses flow over the stationary vanes and rotating blades included therein, converting the thermal energy of the combustion gases into mechanical energy. The turbine, in turn, is coupled to the compressor and the fan. As the turbine spins, it rotates the compressor to thereby compress air for the turbine operation, as well as the fan within the fan duct. The spinning fan draws air into the fan duct, speeds it up, and exhausts it out the back of the turbofan engine, creating thrust for an aircraft or other vehicle to which the turbofan engine is attached.

Often, vehicles incorporating turbofan engines must be able to reduce speed drastically, such as directly after touchdown when an aircraft is landing on an airstrip. Because it is difficult to quicky reduce the speed of a heavy aircraft with mechanical brakes alone, many turbofan engines include a thrust reverser. A thrust reverser is a mechanical component used to block, redirect, and/or reverse airflow within the fan duct, thereby turning the air to exit out of a side of the nacelle rather than a rear of the nacelle. This drastically reduces the forward thrust on the turbofan engine, and in some cases provides reverse thrust, allowing the aircraft or other vehicle to quickly stop.

Known thrust reversers, particularly those employed in ultra-high bypass engines which include large air ducts and thin cowlings, are heavy, bulky, and occupy large volumes with the fan nacelle, thus increasing the overall nacelle envelope and requiring thick cowlings or reinforced housings. The thrust reversers also require complex mechanical linkages and other control components to properly operate, and thus require regular servicing and can prematurely fail, leading to increased downtime of the turbofan engine. There is thus a need for more effective thrust reverser system, particularly one that can easily and compactly be employed on ultra-high bypass engines or similar.

BRIEF SUMMARY

Embodiments of the disclosure are directed to an interspatial blocker of a thrust reversal system and turbofan engines incorporating the same. The interspatial blockers beneficially overcome limitations of known thrust reverser systems, particularly when employed in ultra-high bypass ratio turbofan engines having short and/or thin cross-section fan nacelles.

For example, some embodiments are directed to an interspatial blocker for a thrust reverser system of a turbofan engine. The interspatial blocker comprises a first flap configured to rotate from a first stored position to a first blocking position, a second flap configured to rotate from a second stored position to a second blocking position, and a leading-edge structure rotatably coupling the first flap to the second flap. The leading-edge structure is configured to be installed in a fan nacelle in a substantially radial orientation such that the first flap rotates in a first direction about a first axis extending in a substantially radial direction from the first stored position to the first blocking position, and such that the second flap rotates in a second direction about a second axis extending in the substantially radial direction from the second stored position to the second blocking position, wherein the first direction is opposite to the second direction.

Other embodiments are directed to a thrust reverser system for a turbofan engine. The thrust reverser system comprises a sleeve configured to translate with respect to a stationary portion of a fan nacelle from a deactivated position to an activated position, and a plurality of discrete interspatial blockers circumferentially arrayed within the sleeve. The plurality of interspatial blockers include a first flap configured to rotate from a first stored position, when the sleeve is in the deactivated position, to a first blocking position, when the sleeve is in the activated position, a second flap configured to rotate from a second stored position, when the sleeve is in the deactivated position, to a second blocking position, when the sleeve is in the activated position, and a leading-edge structure rotatably coupling the first flap to the second flap. The leading-edge structure is mounted within the sleeve in a substantially radial orientation such that the first flap rotates in a first direction about a first axis extending in a substantially radial direction from the first stored position to the first blocking position, and such that the second flap rotates in a second direction about the second axis extending in the substantially radial direction from the second stored position to the second blocking position, wherein the first direction is opposite to the second direction.

Still other embodiments are directed to a turbofan engine. The turbofan engine comprises a core nacelle housing a turbofan core, and a cascading fan nacelle housing a fan operatively coupled to the turbofan core and a thrust reverser system. The fan nacelle includes a stationary portion, a translating portion, and a cascading portion. The translating portion is configured to move from a deactivated position to an activated position, and, when the translating portion is in the activated position, the cascading portion extends from the translating portion to the stationary portion providing an exit for airflow within the fan nacelle. The thrust reverser system includes a plurality of discrete interspatial blockers circumferentially arrayed within the translating portion. Each of the plurality of interspatial blockers includes a first flap configured to rotate from a first stored position, when the translating portion is in the deactivated position, to a first blocking position, when the translating portion is in the activated position, a second flap configured to rotate from a second stored position, when the translating portion is in the deactivated position, to a second blocking position, when the translating portion is in the activated position, and a leading-edge structure rotatably coupling the first flap to the second flap. The leading-edge structure is mounted within the translating portion in a substantially radial orientation such that the first flap rotates in a first direction about a first axis extending in a substantially radial direction from the first stored position to the first blocking position, and such that the second flap rotates in a second direction about a second axis extending in the substantially radial direction from the second stored position to the second blocking position, wherein the first direction is opposite to the second direction.

These and other features will be discussed in more detail below in connection with the accompanying drawings.

BRIEF DESCRIPTION OF THE DRAWINGS

Embodiments of the disclosure are described in detail below with reference to the attached drawing figures, wherein:

FIGS. 4A-4C are various views of the turbofan engine shown in FIGS. 3A-3C with the thrust reverser system thereof shown in an activated position;

FIGS. 6A-6C are perspective views of the thrust reverser system of the turbofan engine shown in FIGS. 3A-5B, with the blockers thereof shown in a stored position, a partially deployed position, and a blocking position, respectively.

DETAILED DESCRIPTION

The following detailed description references the accompanying drawings that illustrate specific embodiments of the disclosure. The embodiments are intended to describe aspects of the disclosure in sufficient detail to enable those skilled in the art to practice the various embodiments. Other embodiments can be utilized, and changes can be made without departing from the scope of the disclosure. The following detailed description is, therefore, not to be taken in a limiting sense. The scope of the current invention is defined only by the appended claims, along with the full scope of equivalents to which such claims are entitled.

In this description, references to "one embodiment," "an embodiment," or "embodiments" mean that the feature or features being referred to are included in at least one embodiment of the technology. Separate references to "one embodiment," "an embodiment," or "embodiments" in this description do not necessarily refer to the same embodiment and are also not mutually exclusive unless so stated and/or except as will be readily apparent to those skilled in the art from the description. For example, a feature, structure, act, etc., described in one embodiment may also be included in other embodiments, but is not necessarily included. Thus, the current technology can include a variety of combinations and/or integrations of the embodiments described herein.

Generally, aspects of the disclosure are directed to a thrust reverser system including a plurality of interspatial blockers. The interspatial blockers are configured to move between a stored position and a blocking position. In the stored position, the interspatial blockers have the profile of a vane or fin, and thus do not significantly hinder airflow within a fan duct of the turbofan engine while providing benefits such as reducing swirl of the airflow, thereby offsetting fan duct blockage and fan flow drag that may result from the implementation of the blockers. In the blocking position, the interspatial blockers restrict airflow through a majority of the fan duct exhausting the airflow in the radial direction or otherwise, thus quickly and simply reducing or even reversing thrust of the turbofan engine. The interspatial blockers are designed to fail, if ever, in the stored position, thereby not inadvertently affecting thrust when the turbofan engine is underway. Moreover, the interspatial blockers require far less housing area than known thrust reverser systems, reducing the overall duct length and cowling thickness required to house the system, and thus making their use ideal for large turbofan engine applications such as ultra-high bypass turbofan applications. These and other features will become more apparent in connection with the description of the various figures.

Figure 1:
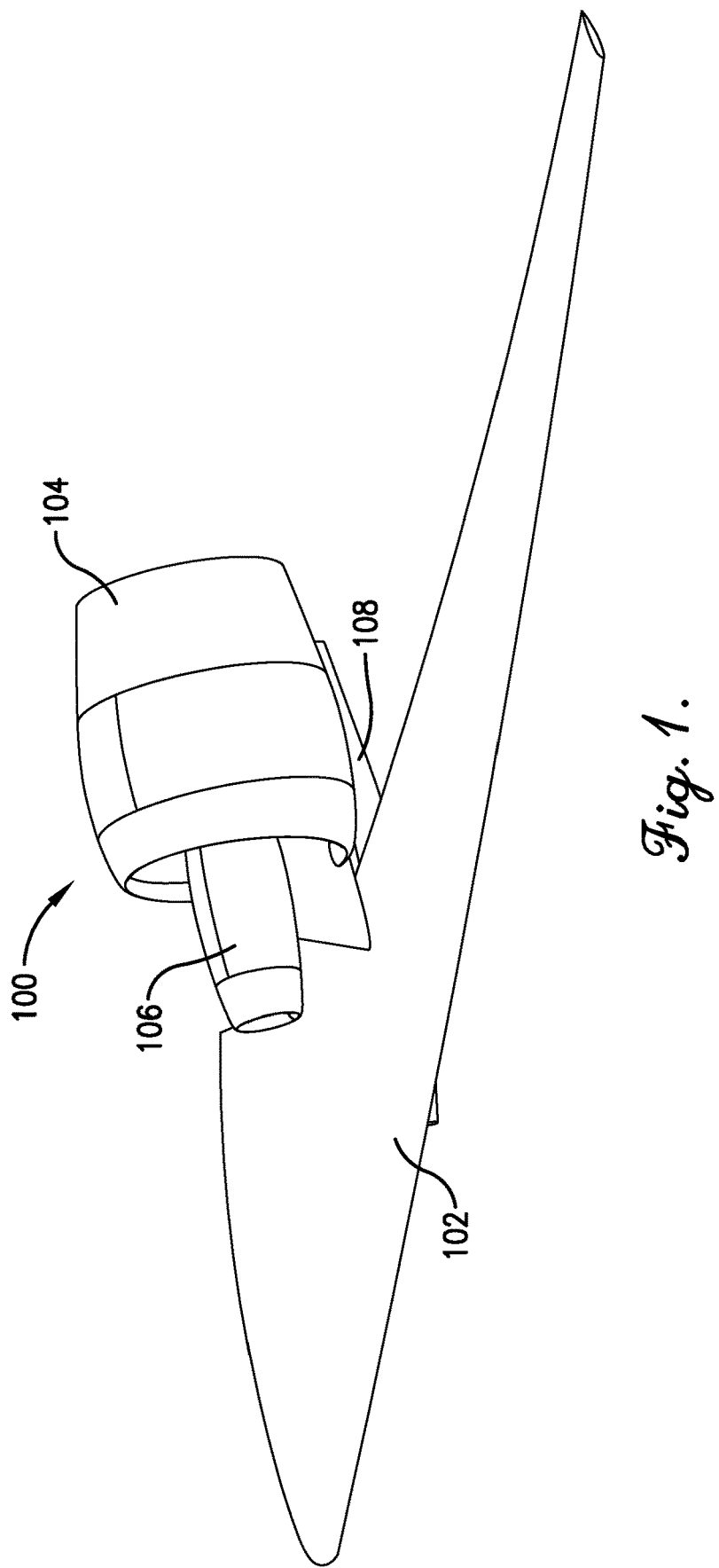
FIG. 1 is a perspective view of a turbofan engine installed on a wing of an aircraft according to one embodiment of the disclosure.
Figure 2:
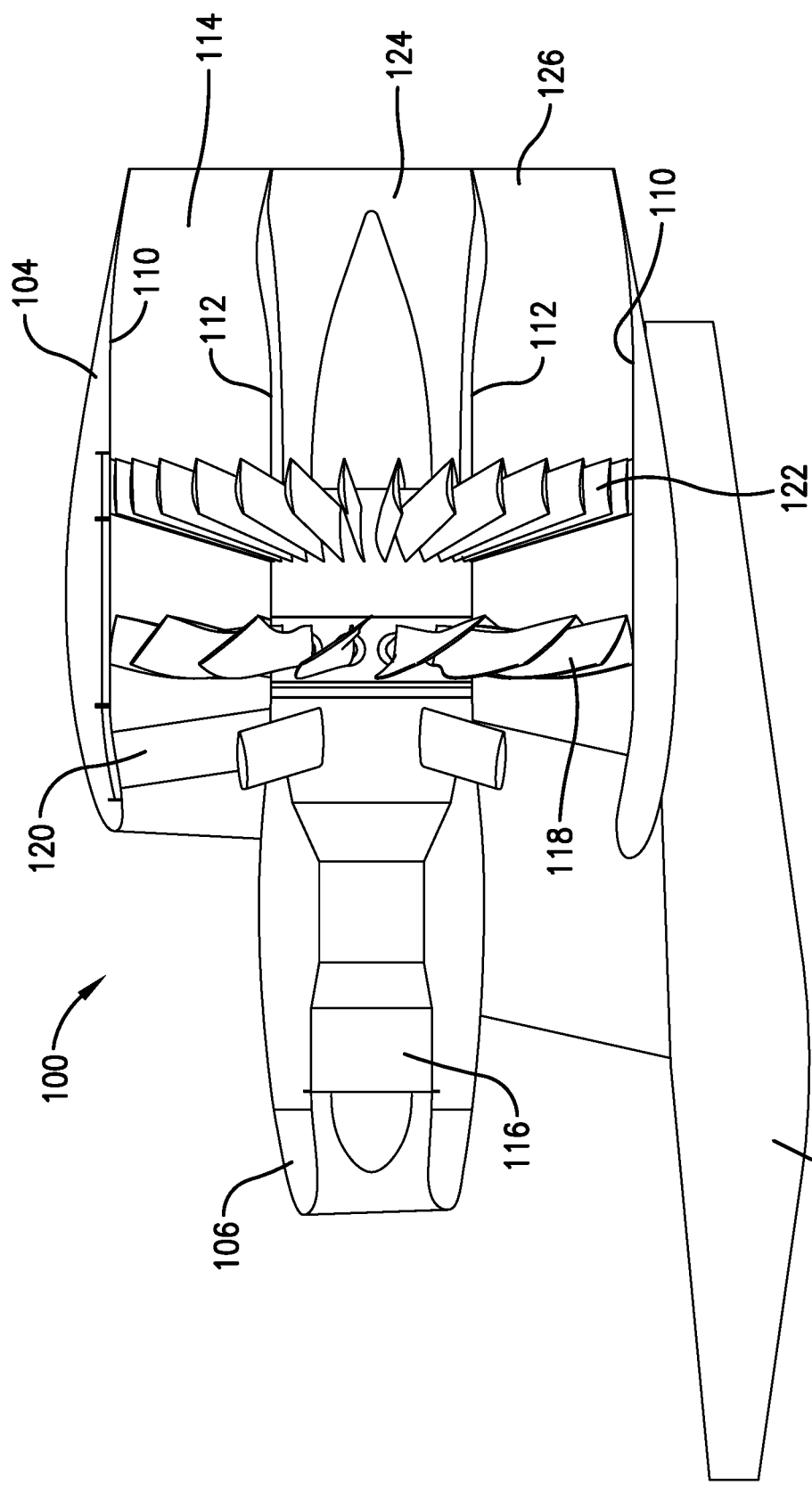
FIG. 2 is a cross-sectional view of the turbofan engine shown in FIG. 1.
Figure 3A:
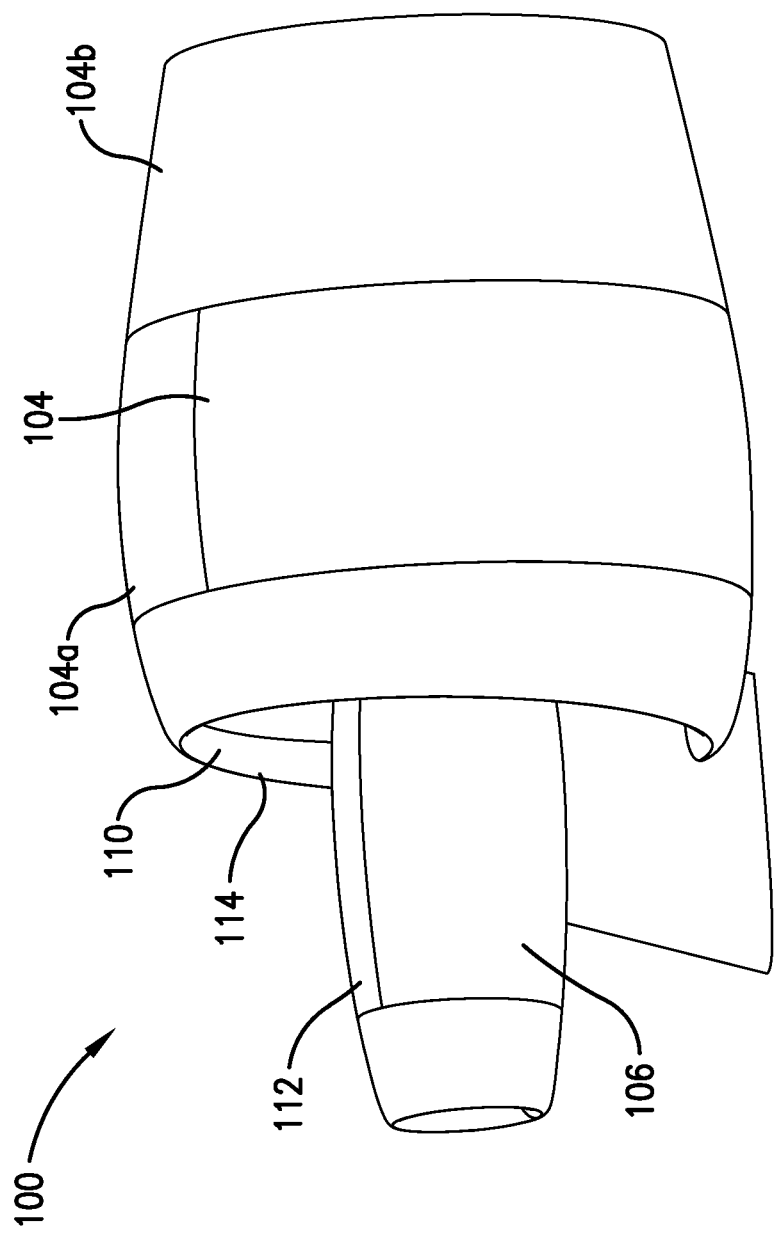
FIGS. 3A-3C are various views of the turbofan engine shown in FIGS. 1-2 with a thrust reverser system installed thereon and with the thrust reverser system shown in a deactivated position.
Figure 3B:
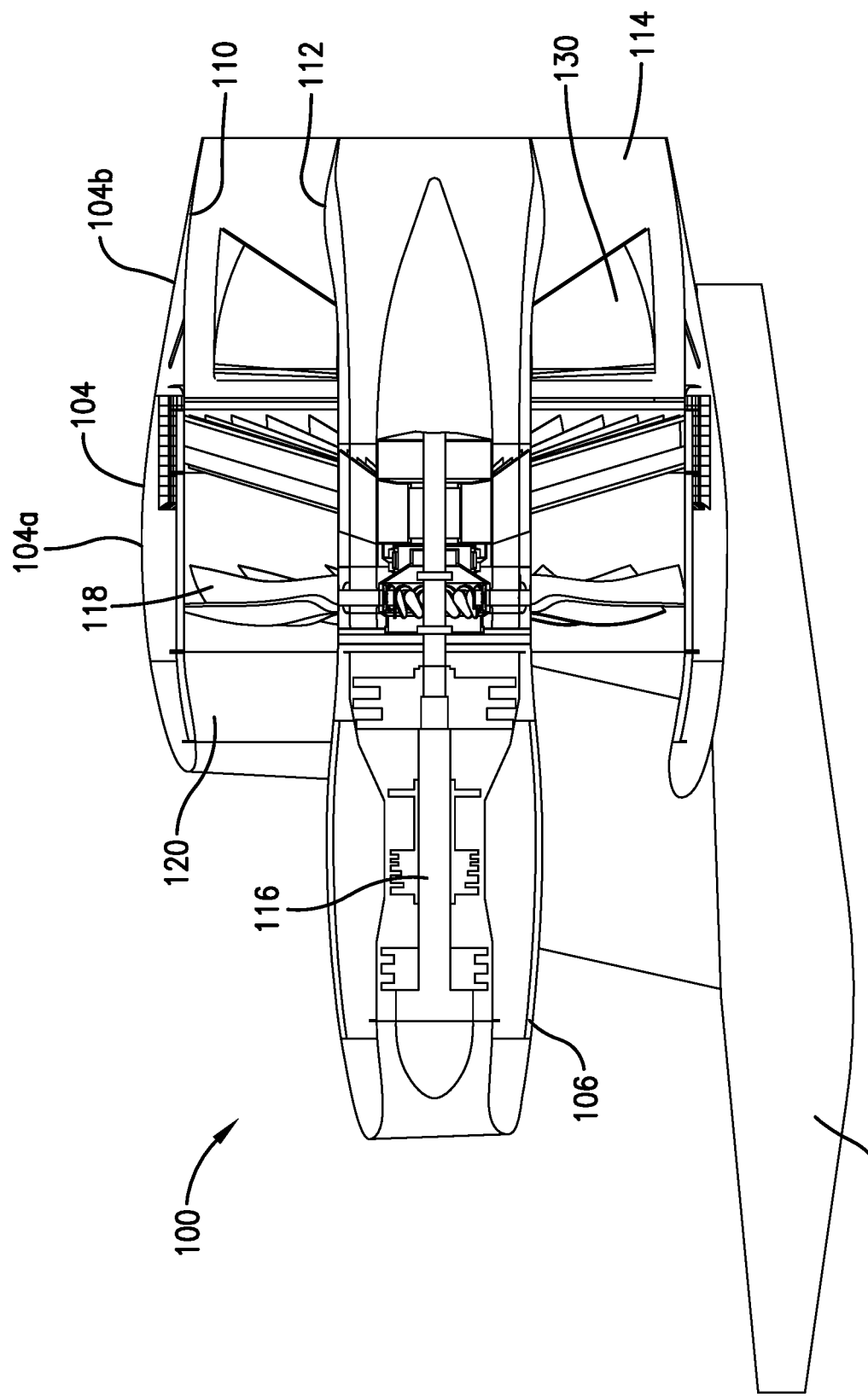
Figure 3C:
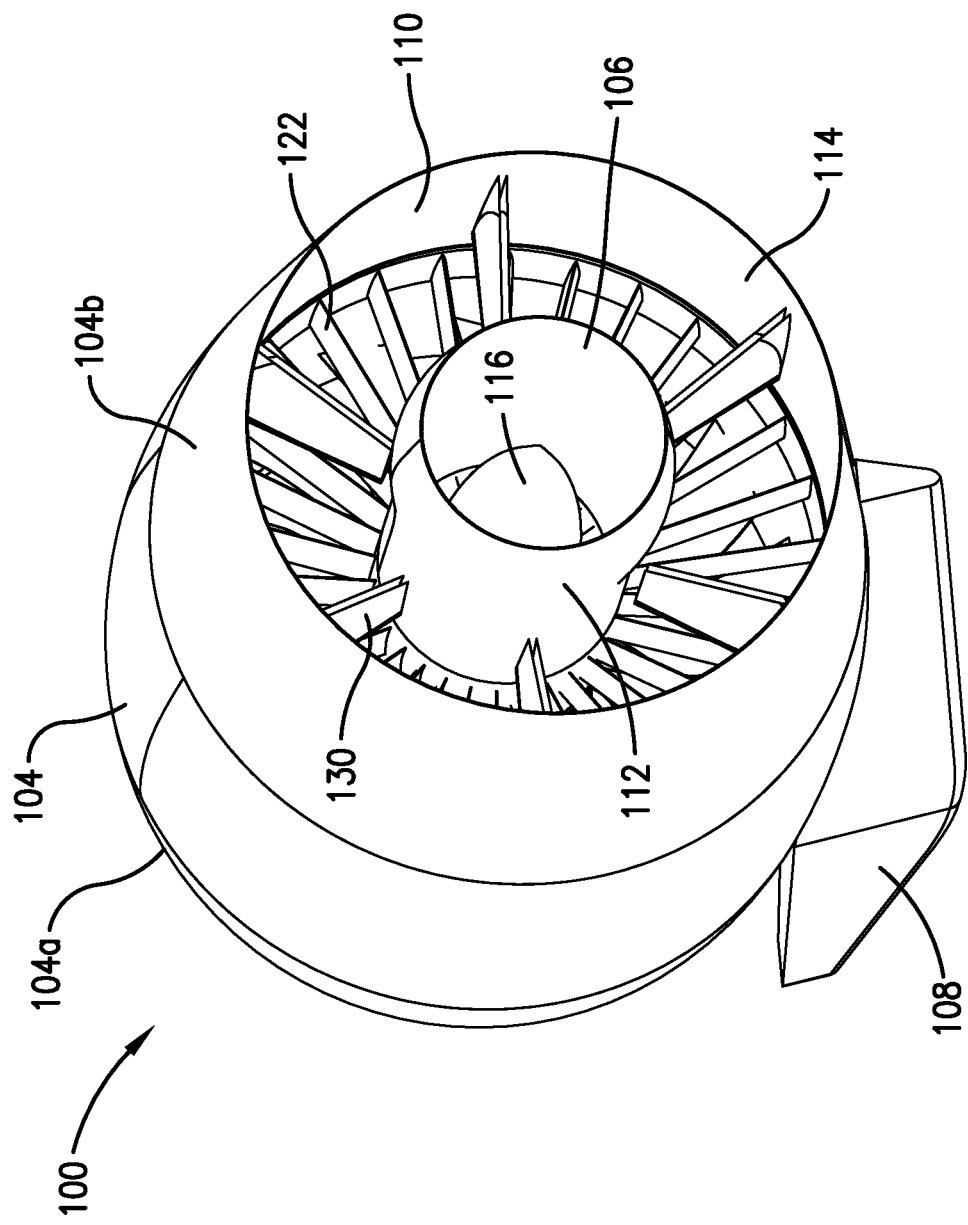
Figure 4B:
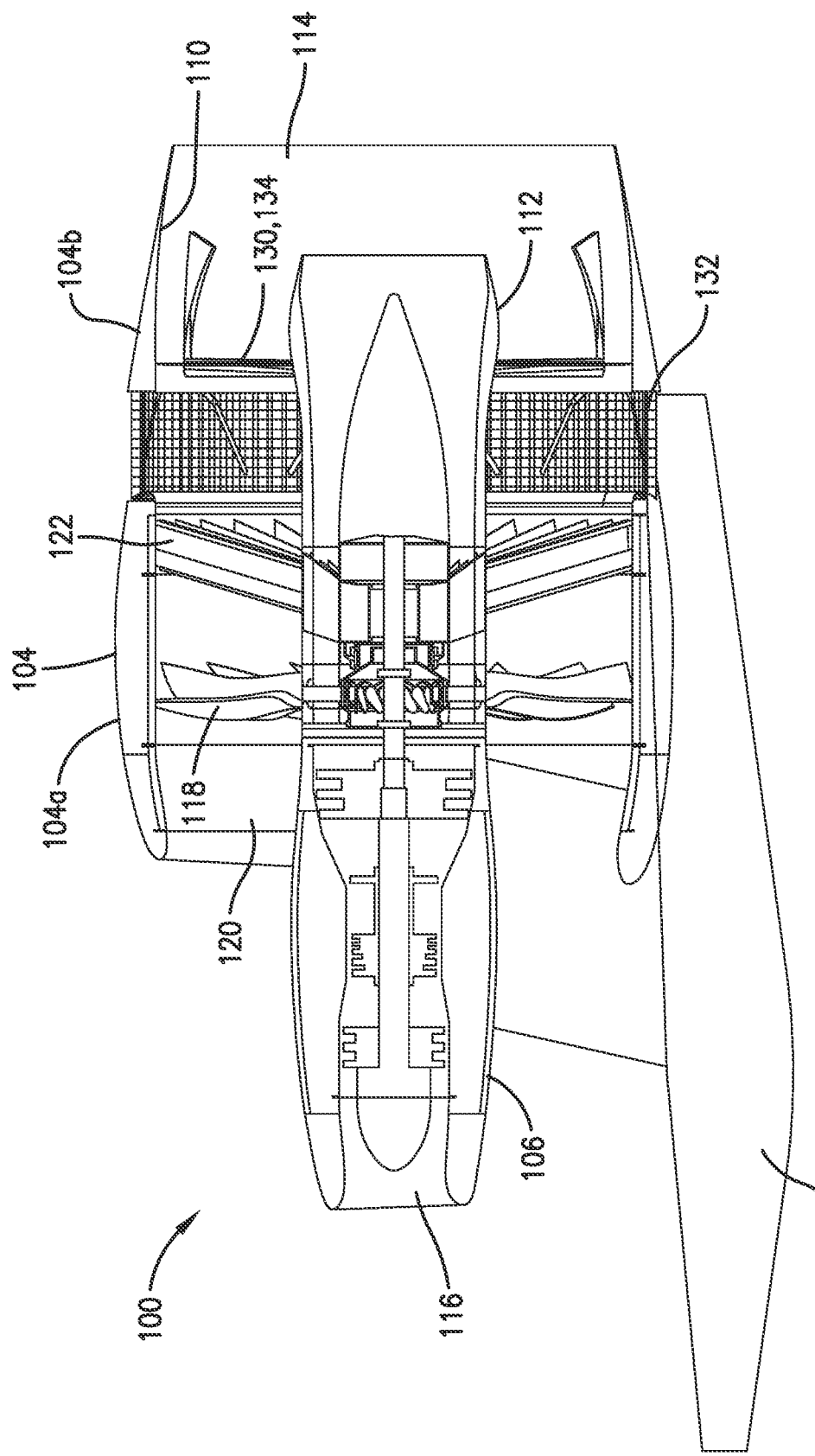
Figure 4C:
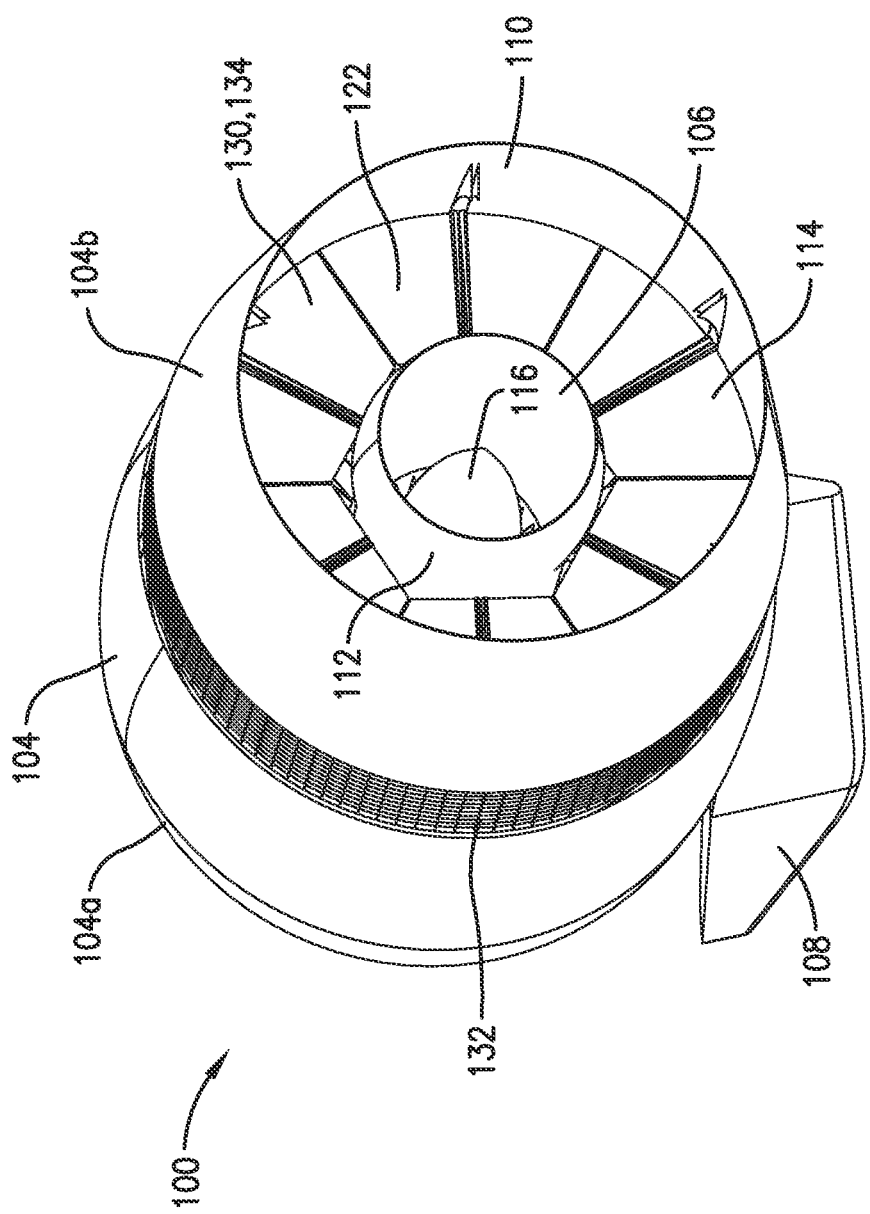
Figure 5A:
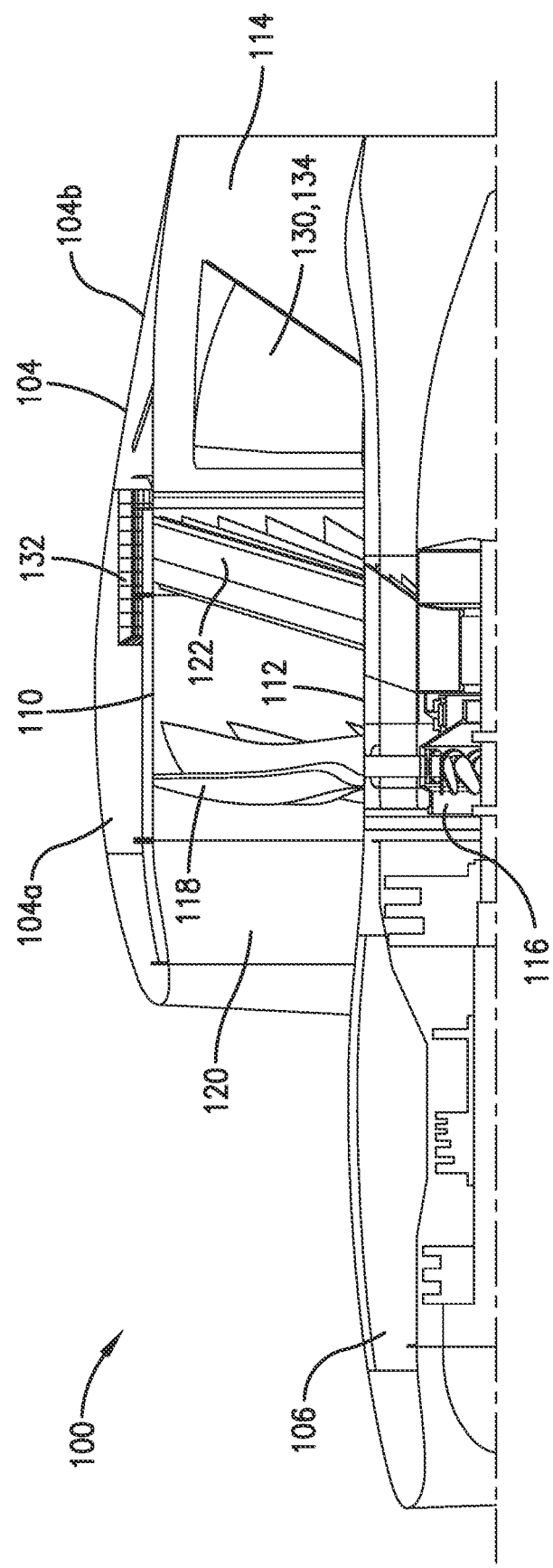
FIGS. 5A and 5B are partial, cross-sectional views of the turbofan engine shown in FIGS. 3A-4C, with the blockers of the thrust reverser system shown in the deactivated position and the activated position, respectively.
Figure 5B:
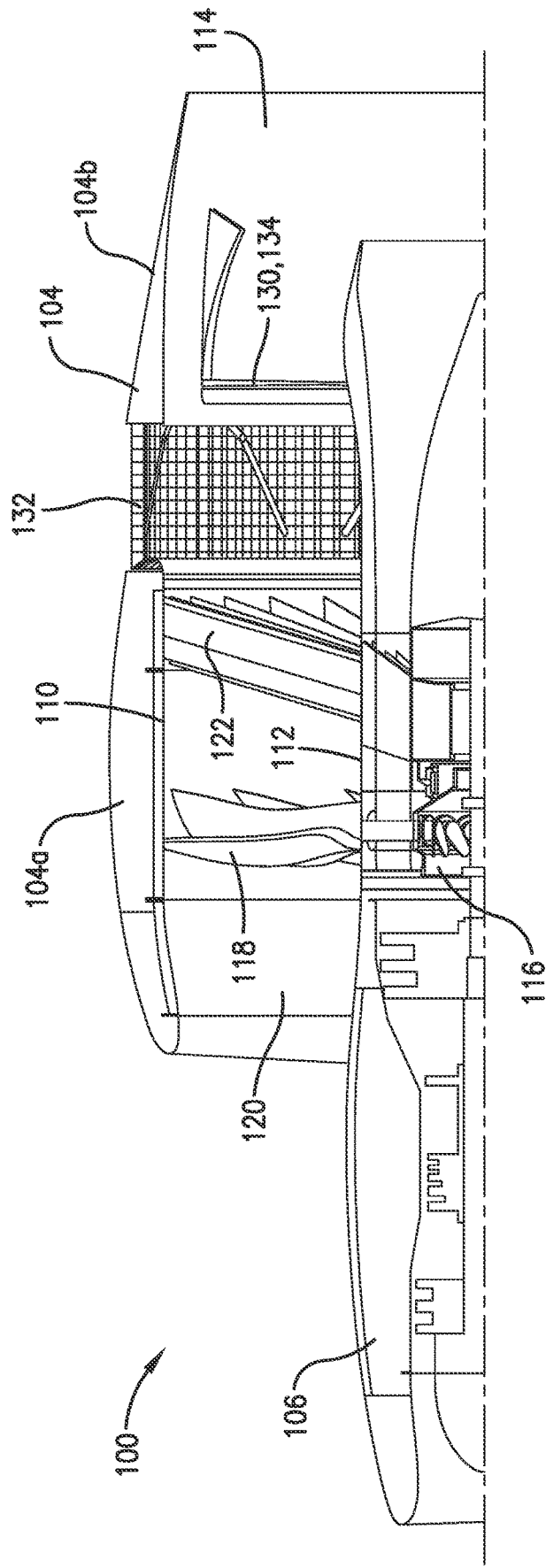

First, FIGS. 1-2 show a turbofan engine 100 as one example application of an engine on which the thrust reverser system may be employed. The turbofan engine 100 is shown attached to a top of an aircraft wing 102 via a support pylon 108 (more particularly, the turbofan engine 100 is an aft fan turbofan engine installed aft on an aircraft wing), however embodiments of the disclosure are not so limited. For example, in other embodiments the turbofan engine 100 could be otherwise mounted to an aircraft, such as mounted in a more conventional underwing, forward location, mounted to a tail portion of the aircraft, mounted directly to the fuselage of the aircraft, or otherwise. Moreover, the turbofan engine 100 could be employed in other vehicles without departing from the scope of the disclosure.

The turbofan engine 100 generally includes a fan nacelle 104 surrounding at least a portion of a core nacelle 106. At a high level, the fan nacelle 104 houses a fan 118 used to draw bypass air through a fan duct 114 to provide the main source of thrust for the engine 100. And the core nacelle 106 houses a turbofan core 116, which may include a gas generator or the like including components such as a compressor, a combustor, and a turbine. In the embodiment shown, the major components of the turbofan core 116 (i.e., gas generator) are located forward of the fan 118, but the disclosure is not so limited and in other embodiments the core 116 could be otherwise located such as, e.g., aft of the fan 118. Moreover, in the embodiment depicted, the core nacelle 106 extends forward of the fan nacelle 104 with the turbofan core 116 located substantially outside of the fan duct 114. In such embodiments, the inner flow surface 112 diameter may be reduced within the fan nacelle 104, thereby beneficially allowing the outer flow surface 110 to move radially inward while maintaining a desired bypass ratio and thus reducing fan nacelle 104 maximum dimensions. Nonetheless, in other embodiments the turbofan engine 100 could be alternatively configured such as, e.g., including most or all of core nacelle 106 within the fan nacelle 104.

A first portion of air flowing into the turbofan engine 100 will enter the turbofan core 116, where it is compressed via the compressor and mixed with fuel and ignited in the combustor. The high-pressure, hot combustion gases leaving the combustor then flow over the vanes and blades of the turbine, spinning the turbine. The gasses are then exhausted from the turbofan core 116 via the primary exhaust 124, which may provide a portion of the thrust for the turbofan engine 100. Although the embodiments discussed herein are described in connection with a gas generator, the disclosure is not so limited and in other embodiments the features could be implanted in an engine having an alternative propulsion system such as, e.g., an electric engine or similar.

A second, greater portion of the air flowing into the turbofan engine 100 enters a fan duct 114. The fan duct 114 an annular passageway defined by an outer flow surface 110, which is an interior face of the fan nacelle 104, and an inner flow surface 112, which is an exterior face of the core nacelle 106. This portion of the air is known as the bypass air (because it bypasses the gas generator), and the ratio of the airflow through the fan duct 114 to the airflow through the turbofan core 116 is known as the bypass ratio. The bypass air optionally passes over a set of vanes 120 to reduce swirl in the airflow or otherwise turn or condition the bypass air before interacting with the fan 118. The fan 118, which is operatively coupled to the turbine in the turbofan core 116, is spinning at high speed and thus speeds up and pressurizes the bypass air. This high-pressure, high-velocity bypass air is then optionally passed over a second set of vanes 122 for reducing swirling or otherwise turning or conditioning before being exhausted via the secondary exhaust 126. The high pressure, high velocity air exiting the turbofan engine 100 via the secondary exhaust 126 creates the majority of the forward thrust for the turbofan engine 100.

Many passenger and other types of aircrafts use what is known as an "ultra-high bypass ratio" (UHBR) turbofan engine, because such UHBR turbofan engines can efficiently move large quantities of air at slower speeds creating the required thrust necessary to propel large commercial airliners and similar aircraft. As the name implies, a UHBR turbofan engine is a turbofan engine having a relatively high bypass ratio, typically 15:1 or even higher. However, these UHBR turbofan engines require increased fan diameters, resulting in large fan nacelles. These larger nacelles are heavy and produce large amounts of aerodynamic drag, which can adversely affect aircraft fuel burn efficiency. Embodiments of the disclosure are directed to a thrust reverser system that can lead to reduced outer diameters and/or lengths of the fan nacelle due to the lightweight and compact nature of the system, thereby mitigating the weight and drag penalties of UHBR turbofan engines.

More particularly, in some embodiments the turbofan engine 100 is equipped with a thrust reverser system 130 to redirect the high pressure, high velocity air leaving the fan 118 through an opening (in some embodiments, cascades) in the side of the fan nacelle 104, thereby drastically reducing or even reducing the thrust provided by the turbofan engine 100 when slowing the aircraft down shortly after touchdown or similar. The thrust reverser system 130 is more compact than known reverser systems and is stored directly within the fan duct rather than the cowling or similar, and thus can be implemented in UHBR turbofan engines while beneficially minimizing the fan nacelle outer diameter and/or length, the thickness of the cowling of the fan nacelle, and/or the internal volume necessary to house the reverser system 130. Put another way, embodiments of the thrust reverser system 130 described herein are beneficially compatible with short UHBR fan nacelles. This will be more readily understood with reference to FIGS. 3A-5B, which shows the thrust reverser system 130 installed on the turbofan engine 100 described above.

In such embodiments, the fan nacelle 104 generally includes two main portions. First, the fan nacelle 104 includes a stationary portion 104a, which may house components such as the vanes 120 and the fan 118, and which does not move or translate relative to the aircraft wing 102 or another vehicle portion to which the turbofan engine 100 is mounted. Second, the fan nacelle 104 includes a translating portion 104b, which is configured to move or translate with respect to the stationary portion 104a in order to deploy the thrust reverser system 130. The fan nacelle 104 may also include a cascading portion 132 that extends between the stationary portion 104a and the translating portion 104b when the translating portion 104b is in the activated position as shown in FIGS. 4A-4C and 5B. The cascading portion 132 may be coupled to the translating portion 104b and thus translate therewith, bridging the gap in the fan nacelle 104 cowling left by the movement of the translating portion 104b. The cascading portion 132 includes a grid-like series of openings that provide a radial exit for the bypass air when the translating portion 104b is in the activated position and the thrust reverser system 130 is deployed (FIGS. 4A-4C and 5B). However, when the translating portion 104b is in the deactivated position and the thrust reverser system 130 is not deployed, the cascading portion 132 tucks under or into the stationary portion 104a and the stationary portion 104a and the translating portion 104b abut one another, thereby sealing off the radial openings and thus directing the bypass air through the secondary exhaust 126 to provide forward thrust for the turbofan engine 100 (FIGS. 3A-3C and 5A).

Although the embodiments described herein are discussed in connection with a cascading-type fan nacelle 104, the disclosure is not so limited and in other embodiments other flow redirecting means could be implemented without departing from the scope of the disclosure. For example, in some embodiments the thrust reverser system 130 could be implemented in a pivoting-door type nacelle. In such embodiments, instead of a portion of the nacelle 104 translating rearward, one or more doors on the side of the nacelle will pivot or otherwise open, creating the radial pathway for the bypass air to exit. Other means of opening the radial passageway in the fan nacelle and/or creating an escape for bypass air could be implemented without departing from the scope of the invention.

The various components of the thrust reverser system 130 will be more readily understood with reference to FIGS. 6A-7C. The thrust reverser system 130 generally includes a plurality of discrete interspatial blockers 134, circumferentially arrayed about a central axis of the fan nacelle 104, the core nacelle 106, and/or the turbofan engine 100. In the depicted embodiment six interspatial blockers 134 are employed, but more or less interspatial blockers could be implemented without departing from the scope of the disclosure.

The interspatial blockers 134 may be each individually directly coupled to the fan nacelle 104 (and, more particularly, the translating portion 104b of the fan nacelle 104), or else the plurality of interspatial blockers 134 could be coupled to a common sleeve or cowling 146, which in turn is then coupled to or otherwise incorporated into the translating portion 104b of the fan nacelle 104. Moreover, although in the depicted embodiment the sleeve/cowling 146 is depicted as a continuous structure, embodiments of the disclosure are not so limited. In other embodiments, the sleeve/cowling 146 could be formed from, e.g., substantially arcuate sleeves and/or pivotally supported thrust reverser halves.

Each interspatial blocker 134 includes a pair of flaps including a first flap 136 and a second flap 138. The pair of flaps 136, 138 are rotatably coupled to one another via a leading-edge structure 140. More particularly, the leading-edge structure 140 includes a hinge or similar mechanism permitting the flaps 136, 138 to rotate about a common axis, although in opposite direction. For example, when viewing the interspatial blocker 134 from a central axis of the turbofan engine 100 looking radially outward, the first flap 136 rotates in a counterclockwise direction from a stored position (FIGS. 6A and 7A) to a blocking position (FIGS. 6C and 7C), and the second flap 138 rotates the opposite direction; i.e., in a clockwise direction. Moreover, in some embodiments the leading-edge structure 140 first flap 136 and second flap may be configured to rotate about two distinct axes that are substantially parallel to each other but not colinear without departing from the scope of the disclosure. Put another way, each flap 136, 138 rotates about a corresponding substantially radially extending axis, which in some embodiments are colinear (i.e., are the same axis) and which in other embodiments are distinct axes.

The leading-edge structure 140 is configured to mount the interspatial blocker 134 is a substantially radial orientation within the fan nacelle 104. That is, the leading-edge structure is disposed within the fan nacelle 104 in such a configuration that the axis of rotation of each of the first flap 136 and the second flap 138 extends substantially in the radial direction. In this regard, "substantially in the radial direction" means that the axis of rotation of the flaps 136, 138 extends generally in a direction perpendicular to the central axis of the turbofan engine, although in some embodiments may lean forward or aft slightly; e.g., up to 45-degrees. Put another way, "substantially in the radial direction" means, when viewed head on, the leading-edge structure 140 extends radially outward from the central axis, and when viewed from the side (FIGS. 3B, 4B, 5A, 5B, and 7A-7C) the leading-edge structure 140 would form a 90-degree angle with the central axis, +/−45-degrees.

In some embodiments, the interspatial blockers 134 are suspended from the outer flow surface 110 and extend toward, but do not integrate with or otherwise attach to, the inner flow surface 112. In such embodiments, this beneficially provides clearance for the first and second flaps 136, 138 to move between the stored position and the blocking position without interference from the inner flow surface 112 or other portion of the turbofan engine 100. Moreover, this may beneficially allow for ease of maintenance, because the thrust reverser system 130 can be accessed and serviced by simply opening the nacelle 104 or other cowling without accessing the core nacelle 106 or similar. However, in other embodiments, portions of the interspatial blockers 134 could extend completely to the inner flow surface 112 and/or the core nacelle 106 and be coupled thereto without departing from the scope of the disclosure. Additionally or alternatively, in some embodiments foam filled or bladder type tips may be employed on the flaps 136, 138 and and/or the leading-edge structure 140 adjacent to the inner flow surface 112 that provide a cross flow seal when the flaps 136, 138 are in the blocking position. Blade type seals may also be employed. To similar effect, separate cooperating features may be incorporated on the inner flow surface 112 that provide a cross flow barrier when the flaps 136, 138 are in the stored position.

The interspatial blockers 134, and, more particularly, the first and second flaps 136, 138 thereof, may be constructed of any desired material without departing from the scope of the disclosure. For example, in some embodiments the blockers 134 and/or the flaps 136, 138 may be constructed of a metallic, composite, or hybrid material. Moreover, in some embodiments the interspatial blockers 134 and/or the flaps 136, 138 thereof may be of monolithic construction, such as machined plates or solid laminate composite, while in other embodiments the interspatial blockers 134 and/or flaps 136, 138 thereof may be formed from a layered or sandwiched type construction.

Figure 7C:
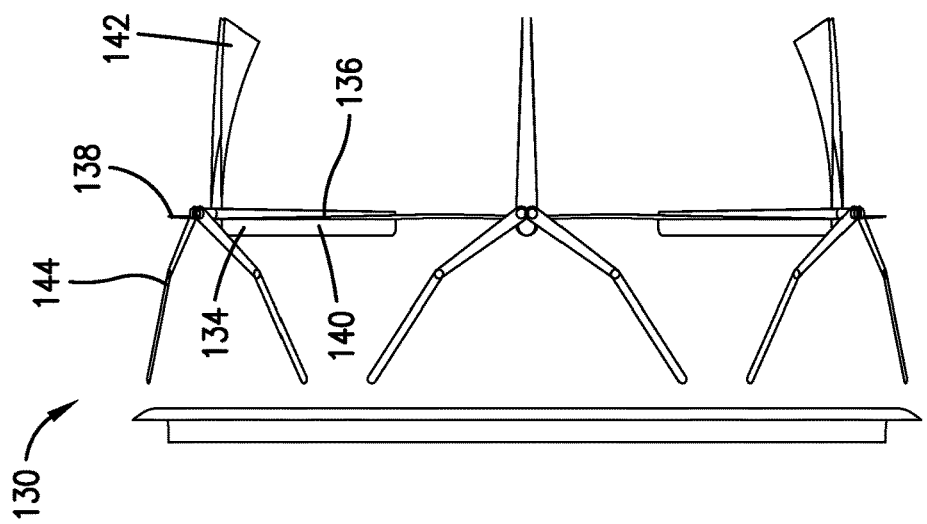
FIGS. 7A-7C are side views of the thrust reverser system shown in FIGS. 5A-5C, again with the blockers thereof shown in the stored position, the partially deployed position, and the blocking position, respectively.
Figure 7B:
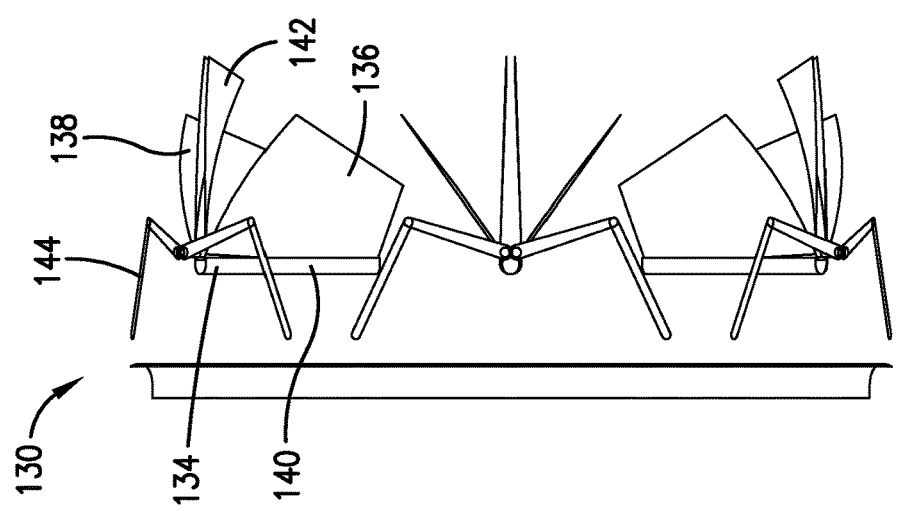
Figure 7A:
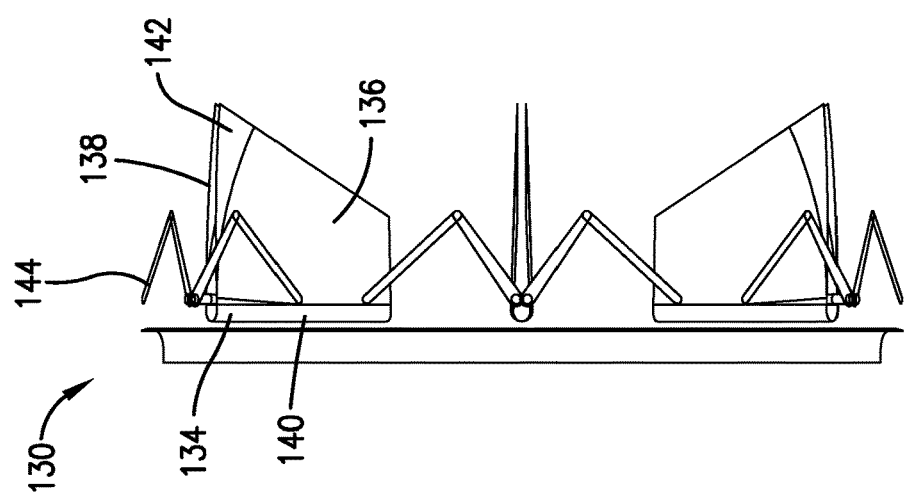

Again, when the translating portion 104b of the fan nacelle 104 is in the deactivated position (FIG. 5A), the cascading portion 132 will be tucked under the stationary portion 104a of the nacelle 104 and thus all bypass air will be directed out of the secondary exhaust 126 to provide thrust. In this embodiment, the interspatial blockers 134 of the thrust reverser system 130 will similarly be in a deactivated, or stored, position, as best seen in FIGS. 6A and 7A. In such a position, the rear faces of the first flap 136 and the second flap 138 of each blocker 134 will face each other and extend generally in the streamwise direction. In this position, the interspatial blocker 134 takes the general profile of a vane or fin, as thus the high-pressure, high velocity bypass air easily flows thereover and out the secondary exhaust 126. The vane or fin profile may beneficially act as another set of vanes instead of or in addition to the vanes 120, thereby reducing swirl in the high-pressure, high-velocity air and improving thrust. In some embodiments, each interspatial blocker 134 includes a fairing 142 mounted on the outer flow surface 110. The fairing 142 provides a structural component for each flap 136, 138 to abut when in the stored position and thus provides rigidity to the interspatial blocker 134 and the flaps 136, 138 thereof as the high-pressure, high-velocity bypass air flows over the vane-shaped stowed blockers 134.

As the translating portion 104b of the fan nacelle 104 moves from the deactivated position (FIG. 5A) to the activated position (FIG. 5B), the flaps 136, 138 of each interspatial blocker 134 rotate about the leading-edge structure 140 and into a cross-stream orientation to thus limit fan flow exit rearward. Again, the first flap 136 rotates opposite to the second flap 138 about the substantially radially extending axis. FIGS. 6B and 7B show the flaps 136, 138 in a partially deployed position (i.e., a position in between the fully stored position and the blocking position), while FIGS. 6C and 7C show the flaps 136, 138 in the blocking position, which is achieved when the translating portion 104b of the fan nacelle 104 is in the activated position. In the blocking position, distal edges of neighboring first and second flaps 136, 138 of neighboring interspatial blockers 134 abut one another in order to form a substantially closed off annular passage defined by the outer flow surface 110 and the inner flow surface 112. More particularly, a first flap 136 of a first interspatial blocker 134 will abut a second flap 138 of a second interspatial blocker 134, while a first flap 136 of a second interspatial blocker 134 will, in turn, abut a second flap 138 of a third interspatial blocker 134, and so on. In this regard, the flaps 136, 138 of the interspatial blockers 134 form an uninterrupted, substantially annular blocking assembly that restricts a majority of the airflow through the fan duct 114, redirecting it out of the fan nacelle 104 in a radial and/or reverse direction through the cascading portion 132. That is, there may be some blowby where the air within the fan duct 114 flows by the interspatial blockers 134 in the blocking position, but more than half of the air in the duct 114 will be diverted radially by the thrust reverser system 130.

The flaps 136, 138 of each interspatial blocker 134 can be actuated using any desired means, such as, in some embodiments, by one or more electric motors, hydraulic rams, screw-jacks, mechanical linkages, and/or other mechanical actuators. Moreover, in some embodiments a controller, CPU, or similar may be employed to provide signals to each actuator thereby synchronizing the movements of the flaps 136, 138 of each individual blocker 134.

In one non-limiting embodiment, and as best seen in FIGS. 7A-7C, each interspatial blocker 134 is provided with a drag link 144 as an example actuator. The drag link 144 includes a first portion pivotably coupled to the stationary portion 104a of the fan nacelle 104, and a second portion coupled to the interspatial blocker 134 and/or to an actuating member thereof such as an arm or similar. The drag link 144 is configured such that when the stationary portion 104a and the translating portion 104b of the fan nacelle 104 abut each other, the drag link 144 biases the flaps 136, 138 to the stowed position. As the translating portion 104b moves rearward to the activated position, the rear portion of the drag link 144 provides the rotary force necessary to unfold the flaps 136, 138 and pull and/or press them towards the blocking position. Conversely, when the translating portion 104b moves back towards the deactivated position, the drag link 144 pulls or presses the flaps 136, 138 back to the stored position, where each of interspatial blockers 134 in turn acts as a vane, as discussed. In this regard, the drag link 144 beneficially automatically deploys and stows the flaps 136, 138 of each interspatial blocker 134 due to the movement of the translating portion 104b without the need for separate electric, hydraulic, or mechanical actuating mechanisms.

The unique configuration of the interspatial blockers 134 provides a failsafe, in that if the drag link 144 or other actuation mechanism were to fail, the forward located pivot point (i.e., the forward located leading-edge structure 140) allows the flaps 136, 138 to self-stow. That is, if the actuation mechanism (drag link 144 or otherwise) were to fail, the force of the high-pressure, high velocity bypass air would press the flaps 136, 138 into the stored position, freeing the air duct 114 of any obstruction. This is an improvement over thrust reverser configurations that have a pivot point aft of any air redirection means, such as "suicide" door configurations or similar. In such configurations, if an actuation mechanism were to fail, the force of the high-pressure, high velocity bypass air would press the doors into the blocking position, thus obstructing the fan duct when it is not desirable to do so.

The novel structure of the thrust reverser system 130 and the interspatial blockers 134 thereof discussed herein beneficially can be employed in a relatively short (in the streamwise direction) fan nacelle 104 because the blockers 134 are installed directly in the fan duct 114 and do not need to be housed within the nacelle 104, fan case, or other portion of the cowling. In such embodiments, portions of the thrust reverser system 130 may be acoustically treated in order to add additional sound absorbing capability to compensate for the reduced length of the fan duct 114. For example, each of the first flap 136 and the second flap 138 could be acoustically treated such that, when the flaps 136, 138 are in the stored position and thus act as a vane or fin within the fan duct 114, the interspatial blockers 134 (more particularly the pair of flaps 136, 138 of each blocker 134) will absorb sound as the high-pressure, high velocity fan air passes thereover. Additionally, by taking the profile of a vane or fin when the stored position, the interspatial blockers may further reduce fan flow swirl providing a measure of propulsive efficiency that may offset fan duct blockage and fan flow drag that may result from their incorporation.

Although various aspects of the disclosure have been described with reference to the embodiments illustrated in the attached drawings, it is noted that equivalents may be employed without departing from the scope of the invention as recited in the claims.

The invention claimed is:

1. An interspatial blocker for a thrust reverser system of a turbofan engine, the interspatial blocker comprising:
   a first flap configured to rotate from a first stored position to a first blocking position;
   a second flap configured to rotate from a second stored position to a second blocking position; and
   a leading-edge structure rotatably coupling the first flap to the second flap,
   wherein the leading-edge structure is configured to be installed in a fan nacelle in a substantially radial orientation such that the first flap rotates in a first direction about a first axis extending in a substantially radial direction from the first stored position to the first blocking position, and such that the second flap rotates in a second direction about a second axis extending in the substantially radial direction from the second stored position to the second blocking position, wherein the first direction is opposite to the second direction, wherein the first axis and the second axis are colinear.

2. The interspatial blocker of claim 1, wherein, when the first flap is in the first blocking position and the second flap is in the second blocking position, the first flap and the second flap are configured to direct air out of cascades of the fan nacelle.

3. The interspatial blocker of claim 1 further comprising a fairing disposed between the first flap and the second flap, wherein, when the first flap is the first stored position and the second flap is in the second stored position, a portion of each of the first flap and the second flap abuts the fairing.

4. The interspatial blocker of claim 1 further comprising an actuation mechanism configured to move the first flap and the second flap from the first and second stored positions, respectively, to the first and second blocking positions, respectively.

5. The interspatial blocker of claim 4, wherein the actuation mechanism is a drag link configured to extend between a stationary portion of the fan nacelle and a translating portion of the fan nacelle.

6. A thrust reverser system for a turbofan engine, the thrust reverser system comprising:
   a sleeve configured to translate with respect to a stationary portion of a fan nacelle from a deactivated position to an activated position;
   an actuation mechanism configured to extend between the stationary portion of the fan nacelle and the sleeve; and
   a plurality of discrete interspatial blockers circumferentially arrayed within the sleeve, each of the plurality of interspatial blockers including:
   a first flap configured to rotate from a first stored position, when the sleeve is in the deactivated position, to a first blocking position, when the sleeve is in the activated position;
   a second flap configured to rotate from a second stored position, when the sleeve is in the deactivated position, to a second blocking position, when the sleeve is in the activated position; and
   a leading-edge structure rotatably coupling the first flap to the second flap,
   wherein the leading-edge structure is mounted within the sleeve in a substantially radial orientation such that the first flap rotates in a first direction about a first axis extending in a substantially radial direction from the first stored position to the first blocking position, and such that the second flap rotates in a second direction about a second axis extending in the substantially radial direction from the second stored position to the second blocking position, wherein the first direction is opposite to the second direction, wherein the actuation mechanism is configured to move the first flap and the second flap from the first and second stored positions, respectively, to the first and second blocking positions, respectively, in mechanical reaction to translation of the sleeve, wherein, for each of the plurality of interspatial blockers, the actuation mechanism is a drag link configured to extend between the stationary portion of the fan nacelle and the sleeve.

7. The thrust reverser system of claim 6, wherein, for each of the plurality of interspatial blockers, the first axis and the second axis are colinear.

8. The thrust reverser system of claim 6, wherein, for each of the plurality of interspatial blockers, when the first flap is the first blocking position and the second flap is in the second blocking position, the first flap and the second flap are configured to direct air out of cascades of the fan nacelle.

9. The thrust reverser system of claim 6, wherein each of the plurality of interspatial blockers further includes a fairing disposed between the first flap and the second flap, wherein, when the first flap is the first stored position and the second flap is in the second stored position, a portion of each of the first flap and the second flap abuts the fairing.

10. The thrust reverser system of claim 6, wherein the plurality of interspatial blockers are configured to be installed in an annular passage defined by an outer flow surface on the sleeve and an inner flow surface on a core of the turbofan engine, and wherein, when the sleeve is in the activated position, neighboring pairs of the first and second flaps of neighboring interspatial blockers of the plurality of interspatial blockers are configured to abut one another thereby restricting airflow through a majority of the annular passage.

11. A turbofan engine comprising:
a core nacelle housing a turbofan core; and
a cascading fan nacelle housing a fan operatively coupled to the turbofan core and a thrust reverser system,
wherein the fan nacelle includes:
a stationary portion;
a translating portion; and
a cascading portion,
wherein the translating portion is configured to move from a deactivated position to an activated position, and
wherein, when the translating portion is in the activated position, the cascading portion extends from the translating portion to the stationary portion providing an exit for airflow within the fan nacelle, and
wherein the thrust reverser system includes:
a plurality of discrete interspatial blockers circumferentially arrayed within the translating portion, each of the plurality of interspatial blockers including:
a first flap configured to rotate from a first stored position, when the translating portion is in the deactivated position, to a first blocking position, when the translating portion is in the activated position;
a second flap configured to rotate from a second stored position, when the translating portion is in the deactivated position, to a second blocking position, when the translating portion is in the activated position; and
a leading-edge structure rotatably coupling the first flap to the second flap,
wherein the leading-edge structure is mounted within the translating portion in a substantially radial orientation such that the first flap rotates in a first direction about a first axis extending in a substantially radial direction from the first stored position to the first blocking position, and such that the second flap rotates in a second direction about a second axis extending in the substantially radial direction from the second stored position to the second blocking position, wherein the first direction is opposite to the second direction, wherein, for each of the plurality of interspatial blockers, the first axis and the second axis are colinear.

12. The turbofan engine of claim 11, wherein, for each of the plurality of interspatial blockers, when the first flap is in the first blocking position and the second flap is in the second blocking position, the first flap and the second flap are configured to direct air out of the cascading portion.

13. The turbofan engine of claim 11, wherein each of the plurality of interspatial blockers further includes a fairing disposed between the first flap and the second flap, wherein, when the first flap is in the first stored position and the second flap is in the second stored position, a portion of each of the first flap and the second flap abuts the fairing.

14. The turbofan engine of claim 11, wherein each of the plurality of interspatial blockers further includes an actuation mechanism configured to move the first flap and the second flap from the first and second stored positions, respectively, to the first and second blocking positions, respectively.

15. The turbofan engine of claim 14, wherein, for each of the plurality of interspatial blockers, the actuation mechanism is a drag link configured to extend between the stationary portion and the translating portion.

16. The turbofan engine of claim 11, wherein the plurality of interspatial blockers are disposed in an annular passage defined by an outer flow surface on the translating portion and an inner flow surface on the core nacelle, and wherein, when the translating portion is in the activated position, neighboring pairs of the first and second flaps of neighboring interspatial blockers of the plurality of interspatial blockers are configured to abut one another thereby restricting airflow through a majority of the annular passage.

* * * * *